Nov. 1, 1949  J. GREEN  2,487,021
MUSICAL TOY

Filed Jan. 10, 1946  2 Sheets-Sheet 1

INVENTOR
Joseph Green
BY
J. B. Felshin
ATTORNEY

Nov. 1, 1949  J. GREEN  2,487,021
MUSICAL TOY
Filed Jan. 10, 1946  2 Sheets-Sheet 2

INVENTOR
Joseph Green
BY
J.B. Felshin
ATTORNEY

Patented Nov. 1, 1949

2,487,021

UNITED STATES PATENT OFFICE 2,487,021

MUSICAL TOY

Joseph Green, New York, N. Y.

Application January 10, 1946, Serial No. 640,316

3 Claims. (Cl. 84—377)

This invention relates to musical toys.

An object of this invention is to provide a musical toy in the form of a book comprising a musical wind instrument with sheets on said instrument, each sheet giving instructions to the child for playing of a tune on said instrument.

A further object of this invention is to provide a device of the character described so constructed that the child can look at a sheet while holding the instrument and blowing thereinto.

Yet a further object of this invention is to provide a device of the character described provided with a number of sheets or pages or leaves with a song on each one so that the pages may be turned and the sheets being so arranged that each of the sheets may be readily seen while the child is blowing the instrument, whereby a number of songs may be played.

Still another object of this invention is to provide a device of the character described comprising a casing which may be held in the hands and provided with means to permit the child to blow into the casing to produce notes of a scale, and a plurality of leaves or pages hinged to the rear of the casing and overlying said casing, said pages being adapted to be turned upwardly so that the child may look at the sheets while blowing through holes at the front edge of the casing, and each leaf containing simple instructions for playing a tune, so that a child may read and follow the instructions on a sheet while blowing into the casing.

Another object of this invention is to provide a device of the character described comprising a box provided with a plurality of numbered openings corresponding to notes in a scale, the instrument being so arranged that a child may blow into the various holes to produce the various notes of the scale, and a sheet on the box on which is marked successive numbers corresponding to the numbered holes through which the child should blow in order to play a tune, said sheet being further provided with numbers one to eight and guide lines leading from the numbers to the various holes to aid the child in blowing the hole corresponding to its number.

Still another object of this invention is to provide a strong, compact and durable toy of the character described, which shall be relatively inexpensive to manufacture, easy to play, which shall be attractive in appearance, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a perspective view of a musical toy embodying the invention;

Figure 1:
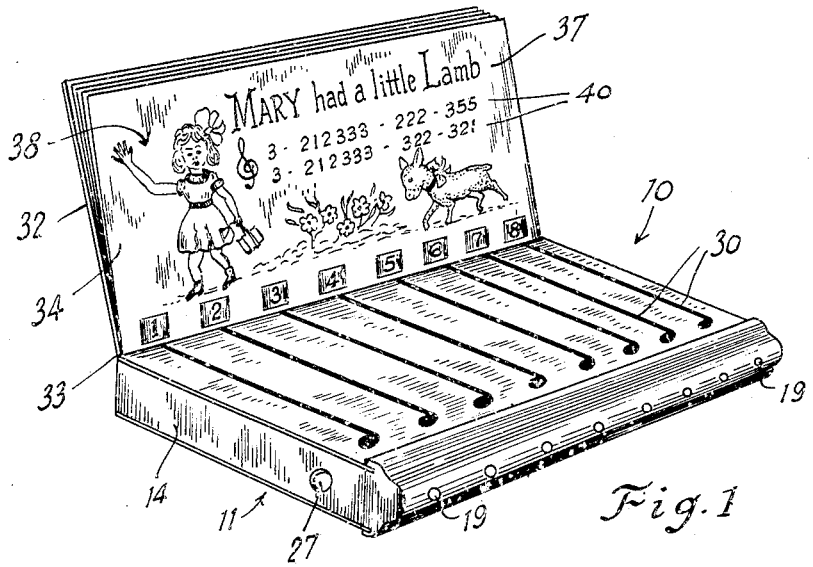
Figure 2:
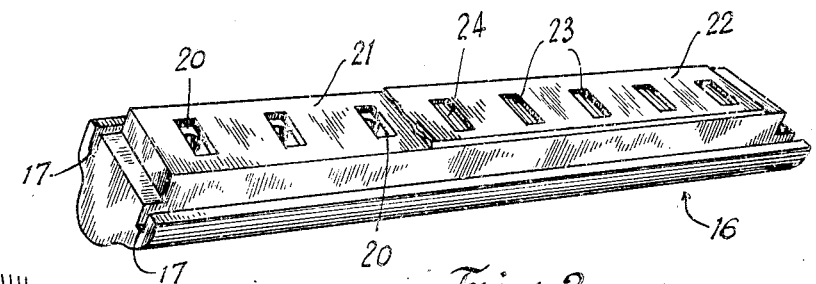
Fig. 2 is a perspective view of the front wall of said toy.
Figure 3:
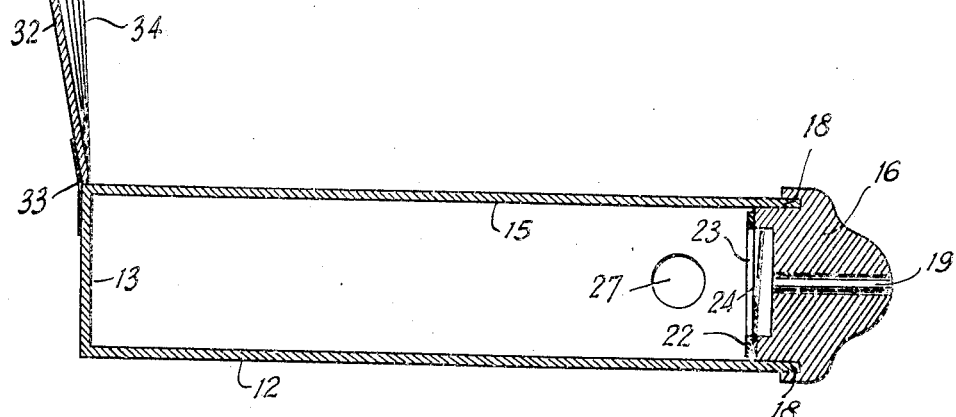
Fig. 3 is a transverse cross-sectional view through the music box or casing.

Referring now in detail to the drawing, 10 designates a musical toy embodying the invention. The same comprises a box or casing 11. Said casing 11 comprises a bottom wall 12, a rear wall 13, end walls 14, and a top wall 15. The front of the casing is closed by a bar 16. The bar 16 may, if desired, be provided with top and bottom longitudinal grooves 17 to receive the forward edges 18 of the top and bottom walls 15 and 12. The bar 16 is furthermore formed with a plurality of equally spaced through openings 19. Said bar is furthermore formed in its front face with a recess 20 communicating with each opening 19 as shown in the drawing. Attached to the inner surface 21 of bar 16 is a reed plate 22 formed with openings 23 registering with the recesses 20. Attached to plate 22 are the reeds 24, each reed registering with an opening 23. The reeds vary so that upon blowing through the various openings 19, the notes of a scale will be sounded.

One side wall 14 is formed with an exhaust opening 27. The top wall 15 is marked with a plurality of longitudinal guide lines 30 extending from front to rear and each line being aligned with one of the openings 19.

Attached to the rear of the box is a cover member 32 adapted to overlie the top of the box. The cover member 32 is hinged to the back of the box, as at 33. Between the cover and box are a plurality of hinged leaves or pages 34. On the inside of each leaf adjacent the bottom thereof are marked the numbers "1" to "8" successively, aligned the lines 30, respectively, so that a child holding the box in front of him and blowing through the openings 19 may read the numbers and watch the guide lines 30 so that he will know the number of each opening he is blowing.

It will now be understood that a child may play a tune by blowing into the holes 19.

On each sheet 34 appears instructions for playing a different tune. Each sheet may hence bear the name of a song, as at 37. Also it may bear a picture 38 illustrating the song. Also on each sheet appears a series of consecutive numerals, as at 40. The numerals are selected from numerals "1" to "8". These numerals indicate the numbers of the openings in which a child should blow consecutively in order to play the tune entitled or designated, as at 37. Thus for example, on the sheet appear the numerals 3-212333, etc. If the child will first blow through opening number 3, then 2, then 1, then 2, then thrice in opening number 3, and so forth, he will play the tune for "Mary Had a Little Lamb."

If a child wishes to play another song, the leaves are turned down until the leaf bearing the song he wishes to play is next. On the back of each sheet appear guide lines similar to lines 30, so that no matter how many sheets are down, the child can always have the guide lines available, to facilitate his playing the correct notes. It will now be understood that the toy is educational in that it will teach the child various tunes. The child can always look at the sheet while playing. He can turn the pages and get a number of songs.

A hand may be cupped over opening 27 to obtain a muting effect. The guide lines make it easy for the child to know which hole he is blowing. The box is easy to hold and it is attractive since it is in book form.

Figure 4:
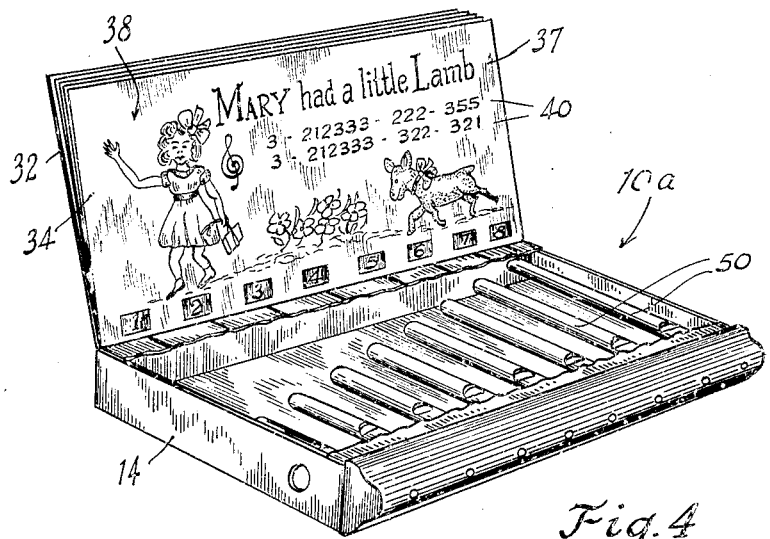
Fig. 4 is a perspective view of a toy embodying the invention and illustrating a modified construction with parts broken away.

In Fig. 4 there is shown a device 10a, embodying the invention, and illustrating a modified construction. The device 10a differs from the device 10 in that pipes 50 of various lengths are substituted for the reed plate in order to obtain the various notes of the scale. For the reeds may be substituted any other sound producing device. Thus the tubes 50 may be in the form of whistles having different pitch.

Figure 5:
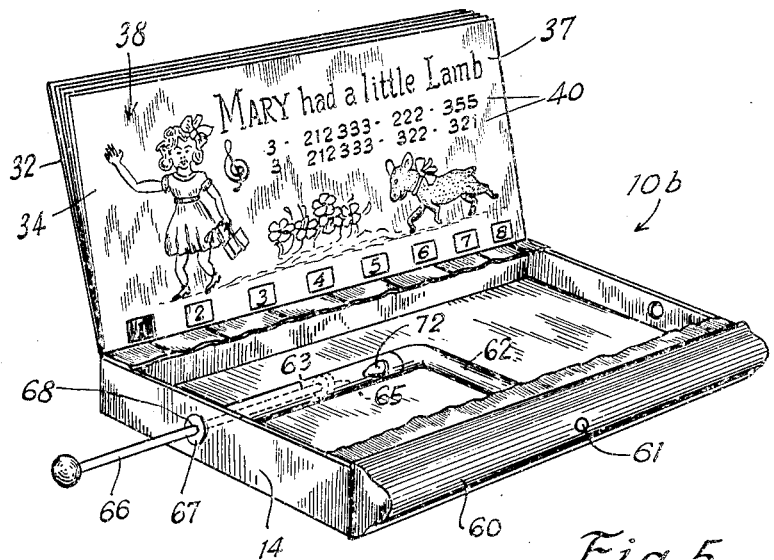
Fig. 5 is a view similar to Fig. 4 and illustrating yet another view of the invention.

In Fig. 5 there is shown a device 10b illustrating still another form of the invention. In Fig. 10b the front bar is substituted by a bar 60 having only a single opening 61 in which a child may blow. Attached to the inside of the bar 60 and disposed within the box is a rearwardly extending tube 62 from which there extends a tube 63 parallel to the bar 60. Tube 63 extends to one side wall 14 of the box. Within the tube 63 is a plunger or piston 65 connected to a piston rod 66. Tube 63 is closed by stopper 67 at wall 14. The stopper 67 is formed with a central opening 68 through which the rod 66 passes. Within the tube 63 is a sound producing device 72. The sound producing device is so constructed that as the child blows in through opening 61, movement of the plunger in and out will produce various notes depending on the distance that the plunger is moved. The child may thus play various tunes. The sound device 72 may be in the form of a whistle.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A device of the character described, comprising a box having a bottom wall, a top wall, a rear wall, side walls, and a front wall, said front wall being formed with a plurality of openings, and means to produce various notes of a scale by blowing in various openings, and a plurality of sheets hinged to the rear wall and adapted to overlie the top wall, said top wall and the back of each sheet being provided with guide lines aligned with the respective openings on said front wall.

2. A device of the character described, comprising a box having a bottom wall, a top wall, a rear wall, side walls, and a front wall, said front wall being formed with a plurality of openings, means to produce various notes of a scale by blowing in various openings, and a plurality of sheets hinged to the rear wall and adapted to overlie the top wall, said top wall and the back of each sheet being provided with guide lines aligned with the respective openings on said front wall, each sheet being marked with a series of numbers to indicate which openings to blow into successively to produce a given tune.

3. A musical instrument comprising a device formed with a row of openings, means to produce the respective notes of the scale upon successively blowing through said openings, and a plurality of hinged leaves adapted to overlie said instrument, each leaf being a series of numbers corresponding to the numbers of the opening, the back of each leaf being provided with a guide line extending from the numbers of the next adjacent leaf toward said respective openings.

JOSEPH GREEN.

REFERENCES CITED

The following references are of record in the file of this patent:

UNITED STATES PATENTS

| Number | Name | Date |
|---|---|---|
| 176,124 | St. John | Apr. 11, 1876 |
| 922,121 | Fraser | May 18, 1909 |
| 1,573,242 | Hand | Feb. 16, 1926 |
| 1,722,852 | Miller | July 30, 1929 |
| 1,797,613 | Peterson | Mar. 24, 1931 |